(12) United States Patent
Jung et al.

(10) Patent No.: US 10,014,550 B2
(45) Date of Patent: Jul. 3, 2018

(54) SECONDARY BATTERY LAMINATING DEVICE AND SECONDARY BATTERY LAMINATING METHOD

(71) Applicant: LG Chem, Ltd., Seoul (KR)

(72) Inventors: Do Hwa Jung, Daejeon (KR); Hyun Won Lee, Daejeon (KR); Joon Sung Bae, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/110,457

(22) PCT Filed: Oct. 2, 2015

(86) PCT No.: PCT/KR2015/010468
§ 371 (c)(1),
(2) Date: Oct. 13, 2016

(87) PCT Pub. No.: WO2016/053060
PCT Pub. Date: Apr. 7, 2016

(65) Prior Publication Data
US 2017/0025702 A1 Jan. 26, 2017

(30) Foreign Application Priority Data

Oct. 2, 2014 (KR) ........................ 10-2014-0133023
Sep. 15, 2015 (KR) ........................ 10-2015-0130400

(51) Int. Cl.
*H01M 10/04* (2006.01)
*H01M 10/0585* (2010.01)
(Continued)

(52) U.S. Cl.
CPC ......... *H01M 10/0404* (2013.01); *B30B 15/00* (2013.01); *H01M 2/145* (2013.01);
(Continued)

(58) Field of Classification Search
CPC .......... H01M 10/0404; H01M 2/1673; H01M 10/0413; H01M 10/0468; H01M 10/0585;
(Continued)

(56) References Cited

U.S. PATENT DOCUMENTS

| 2,976,199 | A | 3/1961 | Rand |
| 2002/0157242 | A1* | 10/2002 | Fukuda ................. B29C 47/062 29/730 |
| 2005/0053840 | A1 | 3/2005 | Jo et al. |
| 2009/0197160 | A1 | 8/2009 | Fujiwara et al. |

(Continued)

FOREIGN PATENT DOCUMENTS

| EP | 1240995 A2 | 9/2002 |
| EP | 2458669 A2 | 5/2012 |

(Continued)

OTHER PUBLICATIONS

Search Report from European Application No. 15845536.0, dated Nov. 17, 2016.

(Continued)

*Primary Examiner* — John Goff
(74) *Attorney, Agent, or Firm* — Lerner, David, Littenberg, Krumholz & Mentlik, LLP (57) ABSTRACT

The present invention relates to a secondary battery laminating device. The secondary battery laminating device for bonding an electrode assembly to a separator includes a transfer part transferring the electrode assembly in a state in which the electrode assembly is disposed on the separator; and a bonding part disposed on a transfer path of the transfer part to contact an entire surface of the electrode assembly and apply heat to the electrode assembly, thereby bonding the electrode assembly to the separator. Thus, a uniform pressure is applied to the electrode assembly to firmly bond the electrode assembly to the separator, thereby manufacturing a secondary battery having superior durability.

6 Claims, 5 Drawing Sheets

(51) Int. Cl.
   *B30B 15/00* (2006.01)
   *H01M 10/058* (2010.01)
   *H01M 10/0583* (2010.01)
   *H01M 2/14* (2006.01)
   *H01M 2/16* (2006.01)

(52) U.S. Cl.
   CPC ....... *H01M 2/1673* (2013.01); *H01M 10/045* (2013.01); *H01M 10/0413* (2013.01); *H01M 10/0459* (2013.01); *H01M 10/0468* (2013.01); *H01M 10/058* (2013.01); *H01M 10/0583* (2013.01); *H01M 10/0585* (2013.01)

(58) Field of Classification Search
   CPC .............. H01M 2/145; Y10T 156/1089; Y10T 156/1092; Y10T 156/1097; Y10T 156/1098; B30B 15/06; B29C 66/81425; B29C 66/8141; B29C 66/81411; B29C 66/81433
   USPC ......................... 29/730, 623.2, 623.3, 623.4
   See application file for complete search history.

(56) References Cited

U.S. PATENT DOCUMENTS

| | | | |
|---|---|---|---|
| 2011/0146064 A1* | 6/2011 | Feaver | H01M 2/1673 29/623.2 |
| 2012/0288749 A1* | 11/2012 | Kim | H01M 4/0404 429/185 |
| 2013/0074711 A1 | 3/2013 | Uematsu et al. | |
| 2013/0260211 A1 | 10/2013 | Min et al. | |
| 2014/0212751 A1 | 7/2014 | Ku et al. | |

FOREIGN PATENT DOCUMENTS

| | | |
|---|---|---|
| KR | 20050006540 | 1/2005 |
| KR | 20120060700 | 6/2012 |
| KR | 20120117266 | 10/2012 |
| KR | 20130033977 | 4/2013 |
| KR | 20140004572 | 1/2014 |

OTHER PUBLICATIONS

International Search Report from PCT/KR2015/010468, dated Jan. 8, 2016.

\* cited by examiner

SECONDARY BATTERY LAMINATING DEVICE AND SECONDARY BATTERY LAMINATING METHOD

CROSS-REFERENCE TO RELATED APPLICATION

The present application is a national phase entry under 35 U.S.C. § 371 of International Application No. PCT/KR2015/010468, filed Oct. 2, 2015, which claims priority from Korean Patent Application No. 10-2015-0130400, filed Sep. 15, 2015, all of which are incorporated herein by reference.

TECHNICAL FIELD

The present invention relates to a secondary battery laminating device and method, and more particularly, to a secondary battery laminating device and method for firmly bonding an electrode assembly to a separator.

BACKGROUND ART

In recent years, chargeable/dischargeable secondary batteries are being widely used for energy sources or auxiliary power devices of wireless mobile equipment. Also, secondary batteries have attracted considerable attention as power sources for electric vehicles (EVs), hybrid electric vehicles (HEVs), and plug-in hybrid electric vehicles (PHEVs), which have been developed to solve limitations, such as air pollution, caused by existing gasoline and diesel vehicles that use fossil fuels.

Such a secondary battery is manufactured in the form in which an electrode assembly together with an electrolyte is provided in a battery case. The electrode assembly may be classified into a stacked type electrode assembly, a folding type electrode assembly, and a stack and folding type electrode assembly. In case of the stacked type or stack and folding type electrode assembly, a unit assembly has a structure in which a cathode and an anode are successively stacked with a separator therebetween. In order to manufacture the unit assembly, a laminating process for bonding the electrode to the separator is necessary.

In general, the laminating process includes a process of heating the unit assembly to bond the electrode to the separator. An indirect heating method using radiation and convection is mainly used as a method for the heating of the unit assembly. Since processes of manufacturing the secondary battery are organically connected to realize mass production, the foregoing method is for laminating the unit assembly while transferring the unit assembly.

However, in the indirect heating method using the radiation and the convection, it takes a long time to rise a temperature of the unit assembly up to a target temperature when compared to a direct heating method in which heat is transferred through direct contact.

To solve this limitation, a secondary battery laminating device using contact-type heating has been developed.

Figure 1:
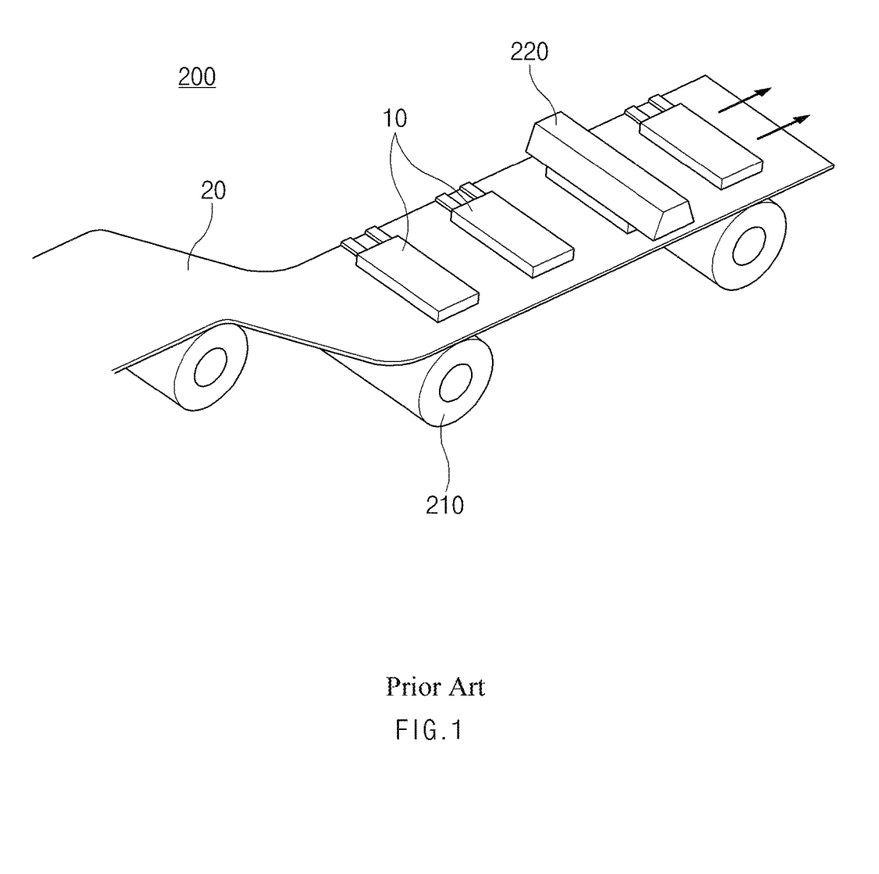
FIG. 1 is a schematic view illustrating an example of a secondary battery laminating device according to a related art.
Figure 2:
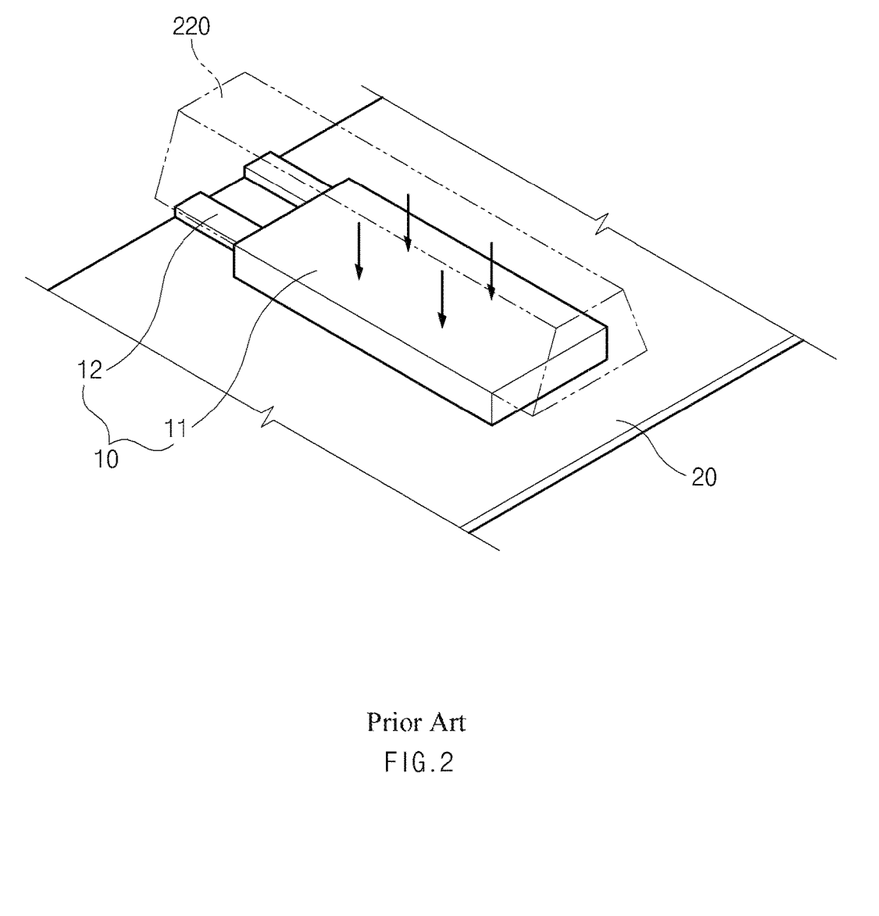
FIG. 2 is a view illustrating a pressure applied to an electrode assembly by the secondary battery laminating device of FIG. 1 according to the related art.

FIG. 1 is a schematic view illustrating an example of a secondary battery laminating device according to the related art, and FIG. 2 is a view illustrating a pressure applied to an electrode assembly of the secondary battery laminating device according to the related art.

However, as illustrated in FIGS. 1 and 2, in case of the secondary battery laminating device 200 according to the related art, even though an electrode assembly 10 varies in thickness in a width direction of a separator, a bonding part 220 having a flat contact surface is used without considering a variation in thickness of the electrode assembly 10. Thus, defects in overall bonding force may occur.

That is, when the secondary battery laminating device 200 having the bonding part 220 with the flat structure according to the related art is used, although an electrode 11 of the electrode assembly 10 is bonded to a separator 20, since bonding between an electrode tab 12 and the separator 20 does not occur, uniform bonding may not generally occur to deteriorate the bonding force.

DISCLOSURE OF THE INVENTION

Technical Problem

To solve the foregoing limitation, an object of the present invention is to provide a secondary battery laminating device in which a uniform pressure is applied to an electrode assembly to firmly bond the electrode assembly to a separator, thereby manufacturing a secondary battery having superior durability.

Technical Solution

An object of the present invention is achieved by a secondary battery laminating device for bonding an electrode assembly to a separator, including: a transfer part transferring the electrode assembly in a state in which the electrode assembly is disposed on the separator; and a bonding part disposed on a transfer path of the transfer part to contact an entire surface of the electrode assembly and apply heat to the electrode assembly, thereby bonding the electrode assembly to the separator.

Also, the electrode assembly may include an electrode and an electrode tab protruding from an end of the electrode, and the bonding part may have a stepped portion to contact the electrode tab and the electrode.

Also, the electrode assembly may be provided in plurality, and the plurality of electrode assemblies may be disposed to be spaced apart from each other on the separator, the separator may have a width that extends outward from an end of the electrode assembly, and the bonding part may have a stepped portion to contact all the electrode assembly and the separator.

Also, a surface of the bonding part, which faces the electrode assembly, may be divided into three areas having stepped surfaces different from each other.

Also, another object of the present invention is achieved by a secondary battery laminating method including: disposing an electrode assembly on a separator; continuously transferring the separator in a state in which the electrode assembly is disposed; and contacting an entire surface of the electrode assembly on a transfer path of the separator and applying heat to the electrode assembly to bond the electrode assembly to the separator.

Also, the electrode assembly may include an electrode and an electrode tab protruding from an end of the electrode, and the bonding of the electrode assembly to the separator may include contacting the electrode and the electrode tab at the same time to apply the heat.

Advantageous Effects

According to the present invention, the secondary battery laminating device in which the electrode assembly is uniformly applied and thus more firmly bonded may be provided.

Also, the same force as the pressing force applied to the electrode assembly may be applied to the separator to improve the durability of the separator in itself.

MODE FOR CARRYING OUT THE INVENTION

Hereinafter, a secondary battery laminating device according to an embodiment of the present invention will be described with reference to the accompanying drawings.

Figure 3:
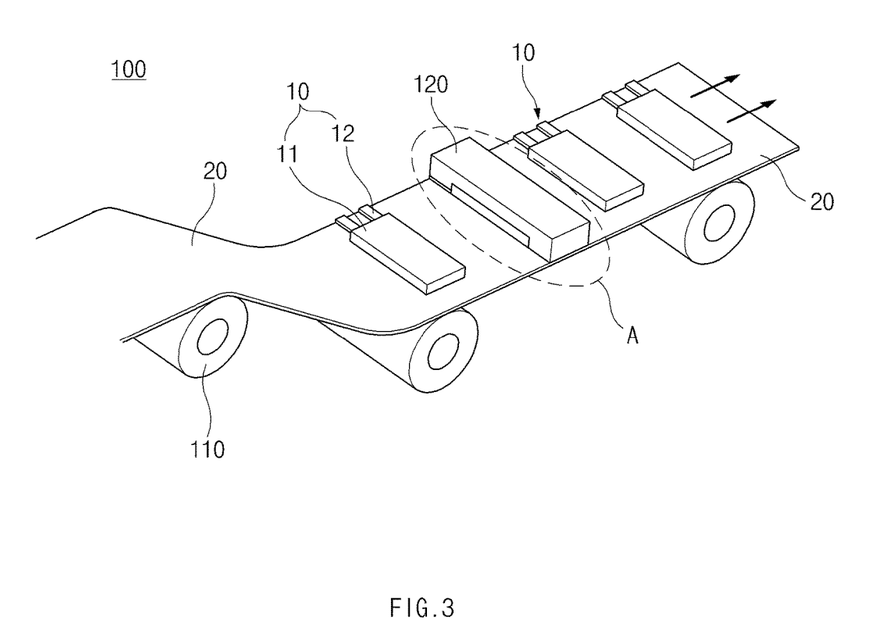
FIG. 3 is a schematic view of a secondary battery laminating device according to an embodiment of the present invention.
Figure 4:
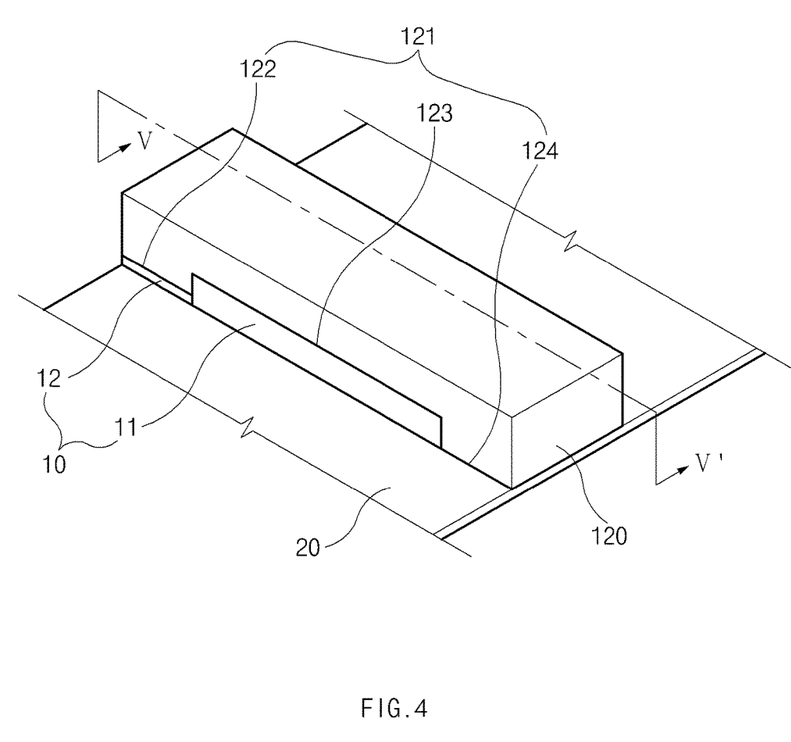
FIG. 4 is a view illustrating a portion A of the secondary battery laminating device of FIG. 3.
Figure 5:
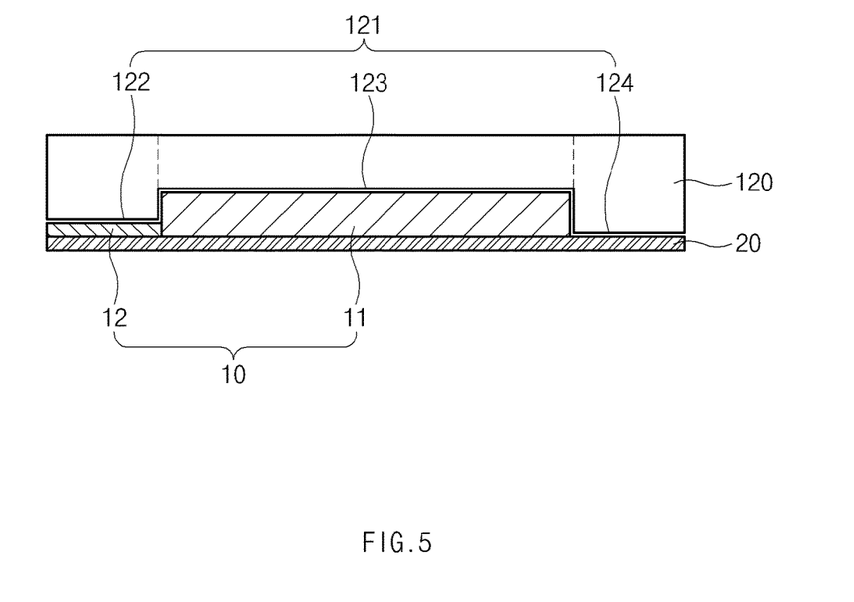
FIG. 5 is a cross-sectional view taken along ling V-V' in the secondary battery laminating device of FIG. 4.

FIG. 3 is a schematic view of a secondary battery laminating device according to an embodiment of the present invention, FIG. 4 is a view illustrating a portion A of the secondary battery laminating device of FIG. 3, and FIG. 5 is a cross-sectional view taken along ling V-V' in the secondary battery laminating device of FIG. 4.

Referring to FIGS. 3 to 5, a secondary battery laminating device 100 according to an embodiment of the present invention may be a device that is used to bond an electrode assembly 10 to a separator 20 in a process of manufacturing a secondary battery. The secondary battery laminating device 100 includes a transfer part 110 and a bonding part 120.

The transfer part 110 is configured to continuously transfer the separator 20 in a state in which the electrode assembly 10 is disposed on a top surface of the transfer part 110. In this embodiment, a transfer roller or a conveyor belt, which is widely used for an in-line process in related technical fields, may be used as the transfer part 110, and thus, its detailed description will be omitted.

The electrode assembly 10 transferred by the transfer part 110 has a stack structure in which a separator (not shown) is disposed between a cathode and an anode, which constitute an electrode 11. Also, an electrode tab 12 is disposed on an end of the electrode 11.

For example, slurry formed by mixing a cathode mixture with a solvent such as NMP may be applied to a cathode collector and then dried and rolled to manufacture the cathode.

The cathode mixture may selectively contain a conductive material, a binder, a filler, and the like in addition to a cathode active material.

The cathode active material may be a material that is capable of causing electrochemical reaction. The cathode active material includes two or more transition metals as lithium transition metal oxide, for example, include: layered compounds such as lithium cobalt oxide ($LiCoO_2$) or lithium nickel oxide ($LiNiO_2$) that is substituted with one or more transition metals; lithium manganese oxide substituted with one or more transition metals; lithium nickel oxide represented by the formula of $LiNi_{1-y}M_yO_2$ (where, M=Co, Mn, Al, Cu, Fe, Mg, B, Cr, Zn, or Ga, and includes one or more elements among the elements, $0.01 \leq y \leq 0.7$); lithium nickel cobalt manganese composite oxides represented by $Li_{1+z}Ni_bMn_cCo_{1-(b+c+d)}M_dO_{(2-e)}Ae$ such as $Li_{1+z}Ni_{1/3}Co_{1/3}Mn_{1/3}O_2$ or $Li_{1+z}Ni_{0.4}Mn_{0.4}Co_{0.2}O_2$ (where, $-0.5 \leq z \leq 0.5$, $0.1 \leq b \leq 0.8$, $0.1 \leq c \leq 0.8$, $0 \leq d \leq 0.2$, $0 \leq e \leq 0.2$, b+c+d<1, M=Al, Mg, Cr, Ti, Si, or Y, and A=F, P or Cl); and olivine lithium metal phosphate represented by the formula $Li_{1+x}M_{1-y}M'_yPO_{4-z}X_z$ (where, M=transition metal, preferably, Fe, Mn, Co, or Ni, M'=Al, Mg, or Ti, X=F, S, or N, $-0.55 \leq x \leq +0.5$, $0 \leq y \leq y0.5$, and $0 \leq z \leq 0.1$), but are not limited thereto.

The conductive material is generally added in an amount of 0.01 wt % to 30 wt %, based on the total weight of the cathode mixture containing the cathode active material. The conductive material may not be particularly limited so long as any conductive material has suitable conductivity without causing adverse chemical changes in the battery. For example, examples of the conductive material may include graphite such as natural or artificial graphite; carbon blacks such as carbon black, acetylene black, Ketjen black, channel black, furnace black, lamp black, and thermal lack; conductive fibers such as carbon fibers and metallic fibers; metallic powder such as carbon fluoride powder, aluminum powder, and nickel powder; conductive whiskers such as zinc oxide and potassium titanate; conductive metal oxides such as titanium oxide; and polyphenylene derivatives.

The binder may facilitate binding between the cathode active material and the conductive material and binding of the cathode active material to the collector. The binder is generally added in an amount of 1 wt % to 30 wt %, based on the total weight of the cathode mixture containing the cathode active material. Examples of the binder may include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene propylene diene terpolymer (EPDM), sulfonated EPDM, stylene butylene rubber, fluoro rubber, and various copolymers.

The filler may be selected from components that are used to inhibit expansion of the electrode. The filler may not be particularly limited so long as any component does not cause adverse chemical changes in the battery and is a fibrous material. For example, examples of the filler may include olefin-based copolymers such as polyethylene and polypropylene; or fibrous materials such as glass fibers and carbon fibers.

The cathode collector has a thickness of 3 μm to 500 μm. The cathode collector may not be particularly limited so long as any cathode collector has suitable conductivity without causing adverse chemical changes in the battery. For example, examples of the cathode collector may include stainless steel, aluminum, nickel, titanium, sintered carbon, and aluminum or stainless steel surface-treated with carbon, nickel, titanium, silver, or the like. The collector may have an uneven surface to improve bonding strength with an active material and be manufactured in various forms such as a film, a sheet, foil, a net, a porous body, a foam body, and a non-woven fabric.

For example, an anode mixture containing an anode active material is applied to an anode collector and then dried to manufacture the anode. As occasion demands, the above-described components such as the conductive material, the binder, and the filler may be contained.

The anode active material may include, for example, carbon and graphite materials such as natural graphite, artificial graphite, expanded graphite, non-graphitizable carbon, carbon black, carbon nanotube, fullerene, and activated carbon; metals such as aluminum (Al), silicon (Si), tin (Sn), silver (Ag), bismuth (Bi), magnesium (Mg), zinc (Zn), indium (In), gallium (Ga), lead (Pb), palladium (Pd), platinum (Pt), and titanium (Ti) and compounds including the foregoing elements; a composite of a metal, a metal compound, carbon, and a graphite material; and lithium-containing nitride. Among them, a carbon-based active material, a silicon-based active material, a tin-based active material, or a silicon-carbon-based active material may be more preferably used as the anode active material and also be used along or in any combination thereof.

In general, the anode collector has a thickness of μm to 500 μm. The anode collector may not be particularly limited so long as any anode collector has suitable conductivity without causing adverse chemical changes in the battery. For example, the anode collector may include copper, stainless steel, aluminum, nickel, titanium, sintered carbon, copper or stainless steel having a surface treated with carbon, nickel, titanium, or silver, and an aluminum-cadmium alloy. Also, like the cathode collector, the anode collector may have an uneven surface to improve bonding strength with an active material and be manufactured in various forms such as a film, a sheet, foil, a net, a porous body, a foam body, or a non-woven fabric.

Also, it is preferable that a separator (not shown) constituting the electrode assembly 10, i.e., a separator (not shown) disposed between the cathode and the anode is formed of the same material as the separator 20, which is an object to be bonded, of the electrode assembly. Also, an insulating thin film having high ion permeability and mechanical strength may be used. In general, the separator may have a pore diameter of 0.01 μm to 10 μm and a thickness of 5 μm to 300 μm. For example, a sheet or non-woven fabric formed of an olefin polymer such as polypropylene, a glass fiber, or polyethylene, which has chemical resistance and hydrophobicity, may be used as the separator.

The above-described materials and structures of the electrode assembly 10 and the separator 20 may be merely examples. Thus, structures and materials which are widely known in the technical fields of the secondary battery may be used as the electrode assembly and the separator.

Also, as described above, an electrode tab 12 having a thin film shape protrudes outward from an end of the electrode 11 including the cathode and the anode in a width direction of the separator 20.

The bonding part 120 is disposed on a transfer path of the transfer part 110. The bonding part 120 presses the electrode assembly 10 and applies heat to the electrode assembly 10 so that the electrode assembly 10 and the separator 20, which are stacked on each other, are bonded to each other.

The bonding part 120 may have a size corresponding to a width of the separator 20 that is transferred by the transfer part 110. Also, a surface of the bonding part 120, which is opposite to the transfer part 110, may be defined as a bonding surface 121. The bonding surface 121 may be divided into three areas in a longitudinal direction thereof.

That is, the bonding surface 121 includes a first area 122, a second area 123, and a third area 124, which are successively divided in the longitudinal direction.

The first area 122 may be an area that contacts the electrode tab 12 when the bonding process is performed, and the second area 123 may be an area that contacts a surface of the uppermost electrode 11, which is exposed to the outside, of the cathode or the anode. The third area 124 may be an area that directly contacts the separator disposed on an area on which the electrode 11 is not disposed.

Since the uppermost ends of the electrode assembly 10 and the separator 20 that contacts the bonding surface 121 have heights different from each other, the first area 122, the second area 123, and the third area 124 constituting the bonding surface 121 may be stepped with respect to the area adjacent thereto to contact surfaces, which have heights different from each other, at the same time.

In more detail, since the separator 20 and the electrode assembly 10, which are objects to be bonded, have heights that gradually increase in order of the separator 20, the electrode tab 12, and the electrode 11, the third area 124 of the bonding surface 121 may protrude at the highest height, and the second area 123 may protrude at the lowest height so that each of the first and second areas 123 and 124 is stepped by the protruding height thereof with respect to the area adjacent thereto.

Hereinafter, a laminating method using the secondary battery laminating device 100 according to an embodiment of the present invention will be described.

The secondary battery laminating method using the secondary battery laminating device according an embodiment of the present invention includes a disposing process, a transfer process, and a bonding process.

In the disposing process, a separator 20 is disposed on a transfer part 110, and a plurality of electrode assemblies 10 are arranged on the separator 20. The plurality of electrode assemblies 10 are arranged to be spaced apart from each other in a transfer direction. A spaced distance between the electrode assemblies 10 may be determined in consideration of a transfer speed, a size of the electrode assembly, a structure (jelly-roll type, stack and folding type, etc.) of the final secondary battery.

In the transfer process, the separator 20 and the electrode assemblies disposed on the separator 20 are continuously transferred by using the transfer part 110. The separator 20 receiving transfer force from the transfer part is continuously transferred to pass through a lower portion of a bonding part 120.

In the bonding process, the electrode assembly 10 and the separator 20 are bonded to each other. A bonding surface 121 that is a lower end surface of the bonding part 120 presses the electrode assembly 10 and the separator 20 in a state of being in contact with the electrode assembly 10 and the separator 20. Simultaneously, the bonding surface 121 may apply heat to bond the electrode assembly 10 to the separator 20.

Here, the first area 122 of the bonding surface 121 is closely attached to the electrode tab 12, the second area 123 is closely attached to the uppermost end surface of the electrode 11, and the third area 123 on which the electrode 11 is not disposed is closely attached to the separator 20 that is exposed to the outside. Thus, all the areas of the bonding surface 121 may take part in the bonding process to provide uniform bonding force to the electrode assembly 10 and the separator 20.

Thus, the first and second areas 122 and 123 that have stepped portions to protrude at heights different from each other may press the electrode tab 12 and the electrode 11, which have heights different from each other, at the same time. Therefore, the electrode assembly 10 may receive uniform pressing force over an entire surface thereof, and thus, the electrode assembly 10 may be more firmly bonded to the separator 20. In addition, the third area 124 of the separator 20, which is exposed to the outside, may be separately pressed to improve the durability of the separator 20 in itself.

The present invention may, however, be embodied in different forms and should not be construed as limited to the embodiments set forth herein. It should be apparent to those having ordinary skill in the art that various changes, modifications, or alterations to the device as described herein may be made, none of which change the spirit of the present device. All changes, modifications, or alterations should therefore be seen as within the scope of the device.

The invention claimed is:

1. A secondary battery laminating device comprising:
a transfer part transferring an electrode assembly comprising electrode tabs protruding from one side of an electrode in a state in which the electrode assembly is disposed on a separator, wherein the electrode tabs are different in thickness from the electrode; and
a bonding part disposed on a transfer path of the transfer part and moving toward the electrode assembly disposed on the separator; and of which one surface contacting an entire upper surface of the electrode assembly and applying heat to the electrode assembly,
wherein the one surface comprises a first region contacting an entire upper surface of the electrode tabs, a second region configuring a stepped portion with the first region and contacting an entire upper surface of the electrode and a third region configuring a stepped portion with the first region and the second region,
wherein the first region and the second region are configured in a shape corresponding to the upper surface of the electrode assembly and the third region is configured to contact the separator, and
wherein the third region is separated from the first region by the second region.

2. The secondary battery laminating device of claim 1, wherein the first region, the second region and the third region are successively divided in a longitudinal direction of the bonding part, a length of the bonding part in the longitudinal direction corresponding to a width of the separator.

3. The secondary battery laminating device of claim 1, wherein the bonding part includes a first thickness in the first region, a second thickness in the second region and a third thickness in the third region, the second thickness less than the first thickness and the first thickness less than the third thickness.

4. A secondary battery laminating method comprising:
disposing an electrode assembly comprising electrode tabs protruding from one side of an electrode on a separator;
continuously transferring the separator in a state in which the electrode assembly is disposed; and
bonding the electrode assembly to the separator by moving a bonding part disposed on a transfer path of the separator toward the electrode assembly and contacting the bonding part to an entire upper surface of the electrode assembly and applying heat to the electrode assembly;
wherein the bonding part has one surface that includes a first region contacting an entire upper surface of the electrode tabs, a second region configuring a stepped portion with the first region and contacting an entire upper surface of the electrode and a third region configuring a stepped portion with the first region and the second region and contacting the separator,
wherein the first region and the second region are configured in a shape corresponding to the upper surface of the electrode assembly, and
wherein the third region is separated from the first region by the second region.

5. The secondary battery laminating method of claim 4, wherein the first region, the second region and the third region are successively divided in a longitudinal direction of the bonding part such that bonding occurs simultaneously across a width of the separator including the electrode assembly thereon.

6. The secondary battery laminating method of claim 4, wherein the bonding part includes a first thickness in the first region, a second thickness in the second region and a third thickness in the third region, the second thickness less than the first thickness and the first thickness less than the third thickness so that the first region, the second region and the third region make simultaneous contact with the electrode tabs, the electrode and the separator, respectively.

* * * * *